Dec. 29, 1931.     H. H. COWELL     1,838,476
DISK FURROW OPENER FOR SEEDING MACHINES
Filed July 16, 1928
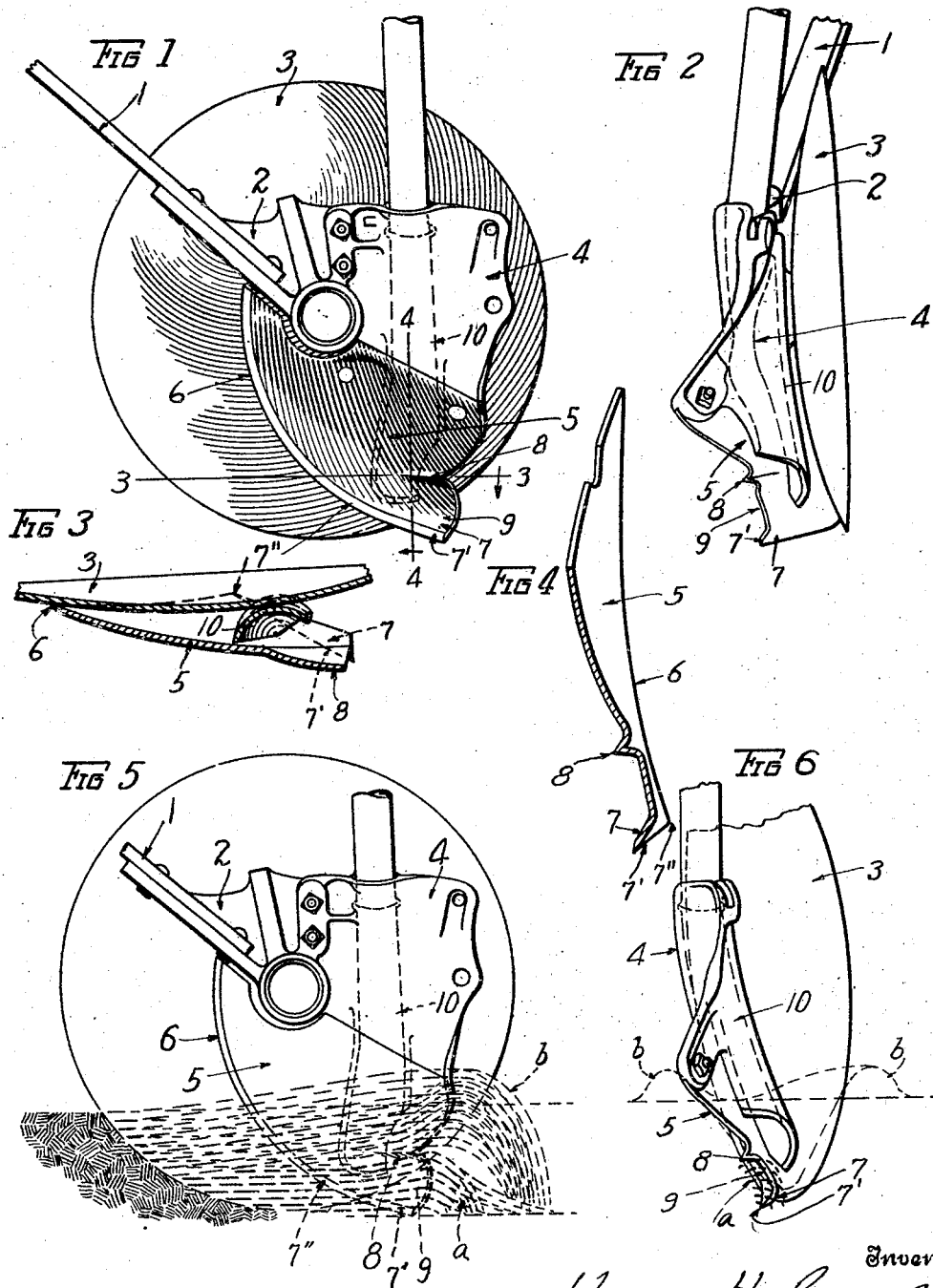
Inventor
Harry H. Cowell
By Staley & Welch
Attorneys Patented Dec. 29, 1931

1,838,476

UNITED STATES PATENT OFFICE

HARRY H. COWELL, OF CLAY CENTER, KANSAS, ASSIGNOR, BY MESNE ASSIGNMENTS, TO OLIVER FARM EQUIPMENT COMPANY, OF CHICAGO, ILLINOIS A CORPORATION OF DELAWARE

DISK FURROW OPENER FOR SEEDING MACHINES

Application filed July 16, 1928. Serial No. 293,060.

This invention relates to improvements in furrow openers for seeding machines, it more particularly relating to furrow openers of the disk type.

One of the objects of the invention is to provide means for depositing upon the seed which has been dropped in the furrow a quantity of moist earth which has been dislodged by the furrow opener from a lower strata of the furrow preliminary to the covering of the seed by the earth of the upper strata which has been uplifted by the furrow opener.

A further object of the invention is to make a furrow with a wide bottom to provide a wide seed bed; a more specific object in this connection being to provide means coacting with the disk which will increase the width of the bottom of the furrow made by the disk.

A further object of the invention is to provide, in connection with the means for making a wide bottom furrow, means for scattering the seed deposited in the furrow over the wide bottom thereof to not only prevent bunching of the seed, but to enable the seed to be so sown as to grow in effect in a plurality of rows in the same furrow so that the furrows may be placed a greater distance apart to prevent excess covering of the seed and without decreasing the proportionate amount of seed sown per acre.

In the accompanying drawings:

Fig. 1 is a side elevation of a furrow opener embodying the improvements.

Fig. 2 is a rear elevation of the same.

Fig. 3 is an enlarged sectional view on the line 3—3 of Fig. 1.

Fig. 4 is an enlarged view in vertical section of the shield, the section being on the line 4—4 of Fig. 1.

Fig. 5 is a side elevation similar to Fig. 1 but showing the parts in operative position in the soil.

Fig. 6 is a perspective view looking from the rear showing the furrow in operative position in the soil.

In the sowing of the seed, particularly in dry localities, the proper germination of the seed is retarded to a material extent by the fact that the seed is not only covered mainly by the upper dry stratum of earth dislodged by the furrow opening device, as it is the upper stratum of earth which falls first into the furrow made by the furrow opener and becomes deposited directly upon the seed, but also by the fact that the seed is generally too deeply covered for best results. To overcome this condition the present device is so designed that a quantity of moist earth is dislodged from the extreme lower portion of the furrow and is gathered and dropped upon the seed prior to the falling into the furrow of the drier upper stratum of earth and the furrow is made with a wide bottom and the seed scattered over the width thereof to prevent bunching and at the same time enable more seed to be deposited in each furrow to thereby enable the furrows to be placed greater distances apart and furnish a place to hill and retain the earth displaced by the disk to prevent over-covering of the seed.

Referring to the drawings, 1 represents a portion of the usual drag bar which is pivotally connected in the usual way at its upper end to the main frame of the machine (not shown). Attached to the lower end of the drag bar is a support 2 upon which is mounted a concavo-convex revoluble disk 3, the disk being arranged in the usual way at an angle to the line of draft. To the rear edge of the support 2 is secured a boot 4 and to the lower edge of the boot 4 is fastened what has been termed a shield 5 which holds back and hills up to some extent in the present device the earth on the rear or convex side of the disk. The forward edge 6 of this shield is curved downwardly and rearwardly and conforms to the convex side of the disk so as to closely hug the same. From the forward edge 6 the upper portion of the shield flares away from the disk so as to stand away from the disk and provide a space for the seed discharging conduit, the greatest degree of flare being at the upper portion of the shield with the lower portion lying in comparatively close proximity to the disk. One side of the shield furrow is provided with a lip 7 which is adapted to enter the wall of the lower portion of the furrow, dislodge some of the earth and assist in guiding it to a position to be readily dropped upon the seed. This lip 7 extends outwardly and downwardly at an angle to the horizontal. That portion of the shield from which the lip 7 projects extends in a forward and rearward direction substantially in a line of draft but the outer edge of the lip, indicated at 7', extends at an angle to the line of draft as shown best in Fig. 3 in which the line of draft is indicated by the arrow, and its point, indicated at 7'' terminates substantially in a line with the lowest cutting edge of the disk, as shown in Fig. 6. Formed on the shield above the lip 7 is a rib 8 which is formed preferably V-shape so as to offer the least resistance to the soil. The lip and rib form a channel 9 which terminates at the rear end of the lower portion of the shield and it will be noticed from Figs. 1 and 5 that the extreme rear end of this channel is forward of the extreme rear end of the upper portion of the shield.

The angle of the concave side of the disk is such that the action of the disk alone produces a deep semi-elliptical shaped furrow, the front edge of the shield 5, mounted on the disk, having no part in this action except as a scraper for the convex side of the disk. As the furrow is produced, a ridge of soil is thrown up by the concave side of the disk as shown in "b" in Fig. 6 and at the same time, the shield on the convex side of the disk being of form similar to a plow mold board extension, at the top rear portion thereof, raises a corresponding ridge as indicated in Fig. 6. The lip 7 on the lower rear edge of the shield, cuts into and flattens the bottom of the semi-elliptical furrow raising a small amount of the moist soil from the deepest part of the trench which is deflected from its upward movement by the rib 8, causing this moist soil to cover the seed, before any of the dry top soil from the ridges produced as above described, falls back into the furrow. This dry soil covering forms a mulch which conserves the moisture and promotes germination. This point especially adapts the furrow opener for conditions existing in the semi-arid wheat growing sections.

As a result of this arrangement, the lip 7 penetrates one wall of the furrow at the extreme lower portion of the furrow, dislodges the moist earth from that portion of the furrow, rolls it up into the channel 9 formed by the lip and rib 8 and finally lets the moist earth drop from the end of the channel directly upon the seed which has been deposited in the furrow. Thereafter the main portion of the earth which has been rolled back by the disk, and in the present case also by the shield, will fall into the furrow upon the moist earth. This operation is shown in Fig. 5 in which the dotted lines a represent the moist earth which has been dislodged by the lip 7 and b represents the main portion of the earth which has been dislodged and spread apart by the shield and disk. By reason of the fact that the rear end of the channel is forward of the rear end of the upper portion of the shield and also because the channel is at the extreme lower end of the shield, it will be readily seen that the earth which has been dislodged by the lip 7 will be the first to fall into the furrow. The dislodgement of this moist earth also results in making a furrow with a wide bottom for the purpose heretofore explained.

The seed is deposited in the furrow through a conduit 10 which is formed integrally with the boot 4 and extends downwardly beyond the same in the space between the shield and disk, with its outer side open. This conduit is so spaced that the seed drops upon the rear wall of the channel portion 9 of the shield and is scattered thereby in a way to prevent the seed from bunching in the furrow.

By a furrow opener such as described, furrows may be made which are separated to such an extent that the main portion of the earth uplifted and thrown aside by the furrow is laid upon the unbroken ground between furrows and retained thereon, only a comparatively small portion of such earth dropping into the furrow. The seed is mainly covered by the moist earth which is uplifted by the clip on the shield and whatever dry earth drops into the furrow from the main body of earth displaced by the furrow opening disk falls on top of this moist earth. It has been found in practice that the centers of the furrow may be separated by a distance of 14 inches instead of 6, 8 or 10 inches as has heretofore been the custom but due to the fact that the furrow made is a wide bottom furrow, the seed will be deposited in scattered condition over the entire width of the furrow so that the seed will grow in rows and to better advantage than when bunched in a narrow bottom furrow and also enable the same quantity of seed to be sown per acre.

While the member which carries the lip which dislodges moist earth from the bottom of the furrow to widen the bottom of the furrow and carry such moist earth to be deposited on the seed has been called a shield, yet it is to be understood that this member is also so formed that the upper portion of it extends beyond the angle formed by the disk so as to cause the earth on the rear or convex side of the disk ridged or hilled at the side of the furrow so that only a portion of such earth will fall into the furrow.

Having thus described my invention, I claim:

1. In a furrow opener for seeding machines, devices for making a furrow, said devices comprising a shield having a lip at its extreme lower end arranged to enter one wall of the lower portion of the furrow and dislodge earth therefrom, together with means on the shield for cooperating with said lip to drop said earth on the seed prior to the covering of the seed with other earth loosened by said furrow opener.

2. In a furrow opener for seeding machines, devices comprising a shield having a lip formed on its lower rear edge, with the outer edge of said lip arranged at an angle to the line of draft and its lower part arranged substantially in line with the furrow, said lip being arranged to penetrate the lower portion of one of the walls of said furrow and dislodge earth therefrom, and means on said shield cooperating with said lip to deposit said earth in the furrow prior to the covering of the seed by other earth loosened by said device.

3. In a furrow opener for seeding machines, furrow opening devices comprising a shield, a lip formed on the lower rear portion of said shield, said lower rear portion of said shield extending substantially in the line of draft and the outer edge of said lip extending in an angle to the line of draft with its forward end substantially in line with the furrow, together with means on said shield cooperating with said lip to deposit the earth loosened by said lip in the furrow prior to the covering of the seed by other earth loosened by said furrow.

4. In a furrow opener for seeding machines, furrow opening devices comprising a shield, a lip formed on the lower rear portion of said shield, said lower rear portion of said shield extending substantially in the direction of the line of draft and the outer edge of said lip extending in an angle to the line of draft with its forward end substantially in line with the furrow, and a rib formed on said shield cooperating with said lip to form a channel to deposit the earth loosened by said lip on the furrow prior to the covering of the seed by other earth loosened by said devices.

5. In a furrow opener for seeding machines, furrow opening devices comprising a shield, a lip formed on the lower rear portion of said shield, said lower rear portion of said shield extending substantially in the direction of the line of draft and the outer edge of said lip extending at an angle to the line of draft, and a rib formed on said shield cooperating with said lip to form a channel to deposit earth loosened by said lip in the furrow prior to the covering of the seed by other earth loosened by said devices, said rib being of V formation and extending substantially in the direction of the line of draft.

6. In a furrow opener for seeding machines, furrow opening devices comprising a shield and a disk, the lower portion of said shield being angularly disposed with respect to said disk, a lip formed on the lower rear portion of said shield, said lip projecting outwardly and downwardly and having its outer edge extended at an angle to the line of draft and its forward end substantially in line with the lower cutting edge of the furrow, and a rib formed on said shield above said lip and cooperating therewith to form a channel to deposit earth loosened by said lip in the furrow prior to the covering of the seed by the other earth loosened by said devices.

7. In a furrow opener for seeding machines, a concavo-convex disk arranged at an angle to the line of draft, a shield mounted on the convex side of said disk and projecting into said furrow, and an outwardly projecting lip formed on the lower portion of said shield arranged to enter one wall of the lower part of the furrow and dislodge earth therefrom, together with means on the shield for cooperating with said lip to drop said earth on the seed prior to the covering of the seed by other earth loosened by said main furrow opener.

8. In a furrow opener for seeding machines, a concavo-convex furrow opening disk arranged at an angle to the line of draft, a shield arranged on the convex side of said disk and projecting into the furrow, a lip formed on the lower edge of said shield with the outer edge thereof arranged at an angle to the line of draft and its forward part arranged substantially in line with the lower cutting edge of the disk, said lip being arranged to penetrate the lower portions of one of the walls of said furrow and dislodge earth therefrom, and means on said shield cooperating with said lip to deposit said earth in the furrow prior to the covering of the seed by other earth loosened by said device.

9. In a furrow opener for seeding machines, a concavo-convex disk arranged at an angle to the line of draft, a shield mounted on the convex side of said disk, a lip formed on the lower rear portion of said shield, said lower rear portion of the shield extending substantially in the direction of the line of draft and the outer edge of said lip extending at an angle to the line of draft, and a rib formed on said shield cooperating with said lip to form a channel to deposit the earth loosened by said lip in the furrow prior to the covering of the seed by other earth loosened by said devices, said rib being of V formation and extending substantially in the line of draft.

10. In a furrow opener for seeding machines, a concavo-convex disk arranged at an angle to the line of draft, a shield arranged on the convex side of said disk and projecting into the furrow, the lower portion of said shield having means to loosen a portion of the earth from the lower part of one wall of said furrow and having a part cooperating therewith to form a channel on the lower portion of said shield to convey said earth to the furrow, and a seed conduit projecting between the disk and shield arranged to project seed against the rear face of said channel to cause the seed to scatter.

In testimony whereof, I have hereunto set my hand this 28th day of June, 1928.

HARRY H. COWELL.